March 10, 1964     O. W. CLEMANS     3,124,181
CLAMP STOP FOR SAW FENCES
Filed Aug. 21, 1962
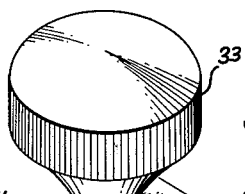
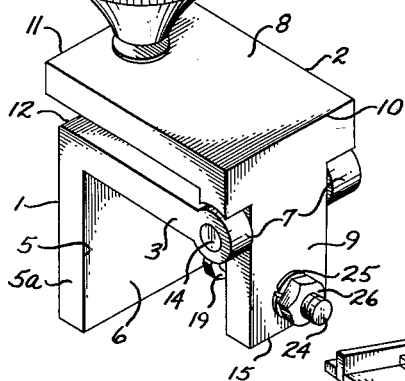
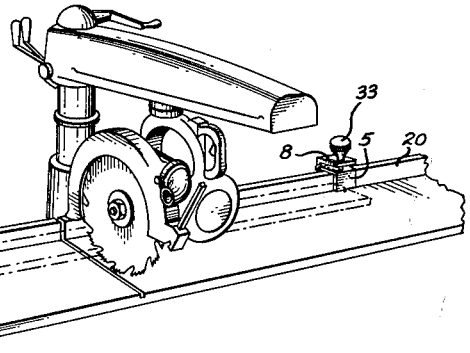
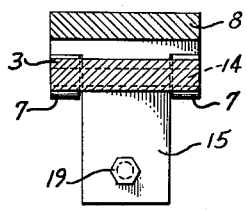
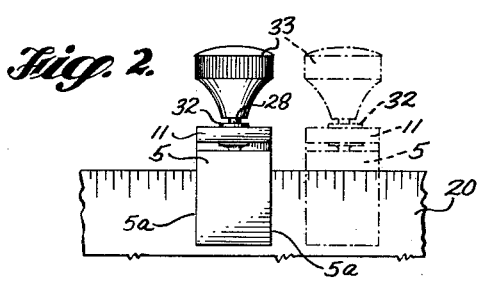
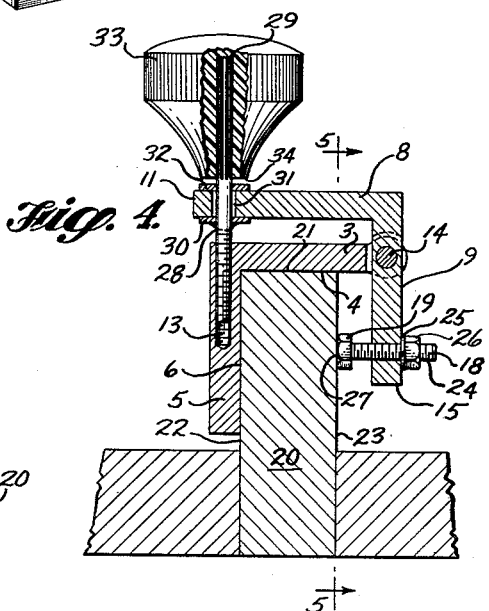
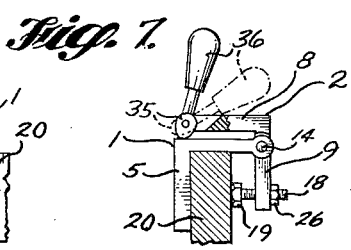
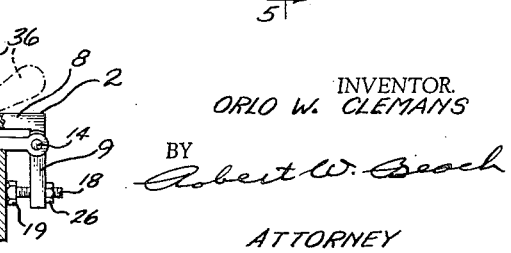
INVENTOR.
ORLO W. CLEMANS
BY Robert W. Beach
ATTORNEY

United States Patent Office 3,124,181
Patented Mar. 10, 1964

3,124,181
CLAMP STOP FOR SAW FENCES
Orlo Willis Clemans, 542 S. Monroe St., Seattle, Wash.
Filed Aug. 21, 1962, Ser. No. 218,307
8 Claims. (Cl. 143—174)

This invention relates to stops and more particularly to a special purpose clamp stop to be secured on fences of radial arm saws.

During woodworking operations it is often desirable to use an adjustable stop to facilitate cutting pieces of lumber to desired lengths. For radial arm saws this can be accomplished by clamping a protruding stop to the saw fence a distance from the cutting plane of the saw corresponding to the length of the piece to be cut and advancing lengthwise lumber received at one end of the saw table until it abuts against the stop prior to each successive cutting operation. Often a multipurpose C-clamp is used to fasten a block to the fence to serve as a stop. Since the C-clamp does not have a surface suitable for a stop, the block is used to form the stop. Because the adjusting screw of the C-clamp securing the stop block extends horizontally from a vertical surface of the fence, attachment and adjustment of the clamp is inconvenient and the C-clamp screw obstructs the saw table or the area behind the saw fence. Further, on saw fences less than 1½ inches in height it is particularly difficult to attach a C-clamp because the screw handle is so close to the work table.

The principal object of the present invention is to provide a special clamp stop particularly adapted to fit a saw fence and which has a suitable surface to be engaged as a stop.

Another important object is the provision of an adjusting means located on the top of the device to facilitate convenient attachment and adjustment of the clamp stop.

It is also an object to provide a device with a large jaw surface which can be secured tightly to the saw fence without damaging the fence and which can be used on graduated fences without danger of defacing the graduations.

Another object of the present invention is the provision of a secondary adjusting means to make the clamp adaptable to fit saw fences of various thicknesses.

A further object is the provision of a device the work-engageable surface of which will be established in position perpendicular to the saw table by the act of placing the clamp on the fence, thus eliminating the need for squaring the stop.

Other objects of the invention will be understood from the specific description of the device which follows. While the drawings illustrate the preferred construction, various changes may be made without departure from the inventive features of the device.

In general, the stop is formed by two angle members which are arranged with one leg of one member in overlapping registry with a leg of the other member and projecting oppositely from their respective corners. The other legs of the respective members are spaced apart in generally parallel relationship and project in the same direction from the legs in overlapping registry, so that the angle members cooperate to form a U-shaped structure. The edge of the underlying leg in overlapping registry is pivoted to the corner portion of the angle member having the overlying leg. Such U-shaped structure may be placed on a saw fence with the base of the U, formed by the overlapping legs in registry, resting on the top of the fence with the generally spaced parallel legs of the respective angle members extending downward along the opposite upright sides of the fence. Adjusting means engaged between the overlapping legs of the two angle members are operable to move these legs apart, causing the spaced parallel legs of the respective members to approach and secure the stop to the fence.

FIGURE 1 is a top perspective of a radial arm saw showing the stop secured to the saw fence, broken lines indicating a piece of lumber abutted against the protruding surface of the stop ready for the cutting operation.

FIGURE 2 is a side elevation of the stop secured to a graduated portion of a saw fence with broken lines indicating a different positioning of the stop.

FIGURE 3 is a top perspective of the stop with parts in the operative position, showing the preferred embodiment of the stop.

FIGURE 4 is a longitudinal section of the stop showing the internal structure, with parts broken away, and FIGURE 5 is a transverse section through the stop taken on line 5—5 of FIGURE 4, showing the pivotal mounting.

FIGURE 6 is a side elevation of the stop mounted on a graduated saw fence in which the operating means is a cam lever, and FIGURE 7 is an end elevation of the modified stop shown in FIGURE 6.

The stop has two principal components, 1 and 2, each component being an angle member consisting of two flat legs projecting from a corner to form an included angle of 90°. Component 1 can be placed on a saw fence 20 such that the surfaces of the legs forming the included angle are adjacent to and fit against the top and front of the fence respectively. The inner surface 4 of the horizontal leg 3 rests on top of the fence, aligning the downwardly projecting leg 5 of the angle member in a vertical position with its surface 6 against one side 22 of the fence. Either edge 5a of component 1 is a suitable surface to form a stop. If conventional angle stock is used to fabricate component 1, either the fillet in the included angle should be removed, allowing such angle to fit snugly against the side and top of the fence meeting at a sharp corner, or the corner of the fence can be bull-nosed sufficiently to allow contiguous contact of the inner angle faces with the top and adjacent side of the fence.

The angle member constituting component 2 is partially nested with the angle member component 1 so that one leg of each of the angle members are disposed in overlapping registry projecting in opposite directions from their respective corners. Thus the leg 3 of the angle member component 1 underlies the leg 8 of the angle member component 2 in overlapping registry. The other leg 5 of angle member 1 and the other leg 9 of angle member 2 projects in generally parallel spaced relationship from the respective corners 12 and 10. While the legs 3 and 8 are stated to be in overlapping registry, it is not necessary that they be of the same size, although they are shown in FIGURES 2 and 3 as being of the same size. The two angle members preferably are interfitted by providing a notch in the end portion of leg 3 of the angle member 1 to provide spaced bifurcations 7. Leg 9 of the angle member 2 can then be sufficiently narrower than the leg 3 so as to fit between the furcations of the bifurcated end.

The two components, 1 and 2, are pivotally connected for relative swinging. For this purpose the furcations 7 have apertures extending through them parallel to the corner 12 of the angle member 1 and the root portion of leg 9 of angle member 2 at the corner 10 of such member has in it an aperture parallel to such corner to be located in registry with the apertures in the furcations 7. Through these aligned apertures extends the pivot pin 14 about the axis of which the two angle members can swing relatively.

The stop formed by the pivoted angle member components 1 and 2 is generally of U-shape or of channel shape, including the base portion formed by the overlapping legs 3 and 8 disposed in registry. The stop can be fitted over the upper edge of the fence 20 as shown in FIGURE 4 to straddle the fence with the upright leg 5 of the component 1 projecting downwardly over one side of the fence and the upright leg 9 of the other angle member component 2 extending downwardly over the opposite upright side of the fence. To secure the stop in place operating means engaged between the angle members are provided to rock them relatively for causing the upright legs 5 and 9 to move toward each other into clamping engagement with the fence. Such operating means conveniently can be engaged between the overlapping legs 3 and 8 of the angle members with the element to be actuated by the operator on top of the stop to provide easy access. Such operating means may swing the overlying leg 8 of angle member 2 upward relative to the underlying leg 4 of the angle member 1, to clamp the stop to the fence. Preferably, the operating means are double acting so that the angle members can be swung positively in the opposite direction to release the stop from the fence.

In the preferred embodiment of the invention shown in FIGURES 1, 2, 3 and 4, screw means are engaged between the overlapping legs 3 and 8 to effect relative swinging of them. Such screw means are engaged between the end portion 11 of the overlying leg 8 and the root portion of the underlying leg 3 or the corner 12. Into a blind tapped hole 13 extending downward through the root of leg 3 into leg 5 is screwed a bolt 28. The upper end 29 of the bolt has splines on it and is anchored in an operating knob 33. The bolt shank extends through a hole 31 in the end portion 11 of leg 8. Upward movement of the bolt relative to such leg is limited by engagement with the lower surface of such leg of a collar 30 which is secured to the central portion of the bolt shank. Between the upper surface of the leg 8 and the lower end 34 of knob 33, a loose washer 32 on the bolt shank is provided.

As the bolt 28 is turned in one direction it will be moved downward into the hole 13 and such movement will pull knob 33 positively downward so that its lower end may bear against the washer 32 which, in turn, will bear against the upper side of the leg 8 to move such leg toward leg 3 for positively moving apart the upright legs 5 and 9 of the clamp stop. If the knob 33 is rotated in the opposite direction the screw 28 wil be moved upward relative to hole 13 so that the collar 30 will bear against the under side of leg 8 and force it away from leg 3. Such relative movement of the legs 3 and 8 will effect approach relative swinging movement of upright legs 5 and 9 about the axis of pivot 14 to effect gripping or clamping action of such upright legs. The aperture 31 is made sufficiently large and collar 30 and the bottom 34 of knob 33 are spaced apart sufficiently with respect to the thickness of leg 8 so that the bolt 28 and such leg may tilt relatively sufficiently to prevent binding of the screw operating means as the legs 3 and 8 in overlapping relationship are swung relatively about the axis of pivot 14.

Preferably, the threads in hole 13 and those of bolt 28 are left-hand screw threads so that, when the knob 33 is turned clockwise, the legs 3 and 8 will be swung apart to move the legs 5 and 9 toward each other for clamping purposes. Conversely, when the knob 33 is rotated in a counterclockwise direction the legs 3 and 8 will be moved closer together so as to spread and release the legs 5 and 9.

In FIGURES 6 and 7 an alternative type of operating means is shown for moving the legs 3 and 8 apart to effect clamping approach of upright legs 5 and 9. In this instance, the end 11 of the overlying leg 8 is bifurcated to form a notch in which an eccentric cam 35 is mounted pivotally. This cam may be rotated by swinging a handle 36 projecting from the cam transversely of its rotative axis. This cam can be swung between the released position in which the handle is disposed as indicated in broken lines in FIGURES 6 and 7 and the clamped or secured position in which the eccentric cam bears against the leg 3 effected by swinging the handle 36 from the broken line position of FIGURES 6 and 7 to the solid line position. Such cam movement will swing the legs 5 and 9 toward each other into fence clamping relationship.

It is desirable for the stop to be usable on fences of different thicknesses. For this purpose, adjustable fence-engaging means can be provided on the upright leg 9 of the angle member 2. It is preferred that the inner surfaces 4 and 6 of legs 3 and 5, respectively, of angle member 1 engage the top and one side of the fence contiguously at all times to provide stability of the stop and to locate the edge surfaces 5a precisely perpendicular to the saw table. For that reason the adjustable fence-engaging means are provided on the upright leg 9 of the angle member 2 having the leg 8 overlying the leg 3. Such adjusting means includes the bolt 18 extending through a hole passing through the end portion 15 of the leg 9 in a direction transverse to the plane of the leg. The head 19 of the bolt 18 is located at the inner side of the leg in a position to bear against the adjacent face of the fence 20 as shown best in FIGURE 4.

In order to enable the effective spacing between the legs 5 and 9 to be adjusted, the bolt 18 can be rotated to project its head beyond the inner surface of leg 9 to a greater or lesser extent. When the bolt has been placed in its desired adjusted position it can be secured in position by placing over its outer end portion 24 a lock washer 25 and a lock nut 26 which can be tightened against the outer surface of the leg 9. To enable the stop to be adjusted at any time to fit a fence of a different thickness, the nut 26 may be loosened, the bolt 18 turned appropriately in one direction or the other to project or retract its head 19, and then the nut can be retightened to secure the bolt again against inadvertent movement.

In assembling the stop, the knob 33 can be assembled on the splined end of bolt 28 and the bolt passed through the washer 32 and aperture 31 of leg 8. The collar 30 can then be secured to the bolt to limit the movement of the bolt through hole 31 in a lengthwise direction. Alternatively, the collar 30 could be formed on or secured to the bolt 28 first and then the splined end of the bolt could be passed through the hole 31 and the knob 33 pressed onto the splined end of the bolt. Next, the narrow portion of the leg 9 can be inserted between the furcation 7 of leg 3 and bolt 28 can be screwed into the hole 13 until the apertures in the furcations 7 and the aperture through leg 9 are substantially in registry. Pivot pin 14 can then be inserted through these aligned holes and appropriately secured in place either by soldering, brazing or other bonding procedure or by a set screw or screws. If bolt 18 is then screwed into the tapped aperture in leg 9 and the washer 25 and nut 26 applied to the outer end of this bolt, the assembly will be complete.

In order to be used, the channel-shaped stop shown in FIGURE 3 is simply fitted over the upper portion of a fence 20, as shown in FIGURES 1, 2 and 4, until the underside 4 of the leg 3 bears on the upper edge 21 of the fence and the inner side 6 of leg 4 bears against the side 22 of the fence. The stop can then be slid along the fence as indicated by the solid and broken line positions shown in FIGURE 2 until it is located in the desired position. Assuming that bolt 18 previously has been adjusted so that the stop will fit a fence of the thickness upon which it has been placed, it is merely necessary to turn knob 33 in a clockwise direction for swinging legs 5 and 9 about the axis of pivot 14 into the position shown in FIGURE 4 in which the surface 27 of the bolt head 19 is pressed firmly against the surface 23 of the fence 20. Because of the large area of contact between the surface 6 of leg 5 and the surface 22 of the fence 20, the clamping of the stop to the fence will not mar even a graduated surface of the fence as illustrated in FIGURES 2 and 6.

The procedure for assembling and using the stop shown in FIGURES 6 and 7 is the same as that described above except that the eccentric clamping cam 35 and handle 36 will be first assembled on the leg 8 of the angle component 2 instead of the bolt 28 being assembled on such component.

I claim as my invention:

1. A clamp stop comprising two angle members arranged with one leg of one angle member in overlapping registry with one leg of the other angle member, said overlapping angle member legs projecting oppositely from the corners of the respective angle members and the other legs of said two angle members projecting in generally parallel spaced relationship in the same direction from the corners of the respective angle members, pivot means connecting the end portion of the overlapping leg of one angle member with the corner portion of the other angle member for relative swinging of said angle members about an axis parallel to the angle member corners, and means engaged between said angle members and operable to exert a force therebetween effecting relating swinging of said generally parallel legs of said angle members about the axis of said pivot means.

2. The clamp stop defined in claim 1, in which the pivot means connects the end portion of the inner one of the overlapping legs with the corner portion of the angle member having the outer overlapping leg, and the means engaged between the two angle members includes thrust means for urging apart the edge portion of the outer one of the overlapping legs and the corner portion of the angle member having the inner one of the overlapping legs for swinging the angle members relatively to decrease the spacing between the end portions of the generally parallel legs of the two angle members.

3. The clamp stop defined in claim 2, in which the thrust means includes screw means engaged between the two angle members.

4. The clamp stop defined in claim 2, in which the thrust means includes eccentric cam means engaged between the two angle members.

5. A clamp stop comprising a first angle member, a second angle member arranged with one leg thereof in overlapping registry with one leg of said first angle member, pivot means connecting the end portion of one leg of said first angle member to the root of one leg of said second angle member in and parallel to the included corner of said second angle member and one leg of each of the respective angle members projecting in the same direction from said legs in overlapping registry in a generally parallel spaced apart relationship with the included surfaces of the legs diametrically opposed, and adjustable thrust means between the unpivoted leg of said second component and said pivoted leg of said first component operable to effect relative swinging between the respective angle members.

6. A clamp stop comprising two angle members arranged with one leg of one angle member in overlapping registry with one leg of the other angle member, said angle members having their other legs projecting in the same direction from said legs in overlapping registry and in a generally parallel spaced apart relationship with the included surfaces of said opposite legs diametrically opposed, pivot means connecting the end portion of one leg of one angle member in and parallel to the included corner of the other angle member, and adjustable thrust means between said legs of the respective angle members in overlapping registry and operable to effect relative swinging of the respective members.

7. The clamp stop defined in claim 6, in which the leg opposite the leg of the angle member having the outer overlapping leg in registry includes an adjustable fencing engaging means in the end portion of said leg projecting perpendicularly above the included surface of said leg.

8. A clamp stop as defined in claim 6, in which the pivot means connecting the end portion of the inner one of the overlapping legs with the included corner portion of the angle member having the outer overlapping leg includes a bifurcated end on the inner overlapping leg with the notch perpendicular to the surface of said inner leg and a hole through the bifurcation parallel to the corner, a narrow leg on the angle member having the outer overlapping leg, said leg opposite to said overlapping leg and having a width approximately that of the notch in said bifurcated end of said inner leg and a hole through the root of said narrow leg parallel to the corner of said angle members having the outer overlapping leg, and a pivot pin through the holes in the furcation of said inner leg and through the hole in the root of said narrow leg when said narrow leg is disposed in the notched end of said inner leg with the holes of the respective angle members in registry for relative swinging between the respective angle members, axially of said pivot pin.

References Cited in the file of this patent

UNITED STATES PATENTS

| 160,960 | Rydbeck | Mar. 16, 1875 |
| 1,519,187 | Braley | Dec. 16, 1924 |
| 1,566,225 | Mills | Dec. 15, 1925 |
| 2,381,564 | Taylor | Aug. 7, 1945 |
| 2,787,301 | Anderson | Apr. 2, 1957 |